(12) United States Patent
Fan

(10) Patent No.: US 9,570,014 B2
(45) Date of Patent: Feb. 14, 2017

(54) FIELD SEQUENTIAL COLOR LIQUID CRYSTAL DISPLAY DEVICE AND COLOR CONTROL METHOD THEREOF

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 231 days.

(21) Appl. No.: 14/400,546

(22) PCT Filed: Oct. 24, 2014

(86) PCT No.: PCT/CN2014/089428
§ 371 (c)(1),
(2) Date: Nov. 11, 2014

(87) PCT Pub. No.: WO2016/049956
PCT Pub. Date: Apr. 7, 2016

(65) Prior Publication Data
US 2016/0275878 A1 Sep. 22, 2016

(30) Foreign Application Priority Data

Sep. 30, 2014 (CN) .......................... 2014 1 0525850

(51) Int. Cl.
*G09G 3/34* (2006.01)
*G09G 3/36* (2006.01)
(Continued)

(52) U.S. Cl.
CPC .......... *G09G 3/3413* (2013.01); *G02B 6/0068* (2013.01); *G02B 6/0073* (2013.01);
(Continued)

(58) Field of Classification Search
CPC ...... G09G 3/36; G09G 3/3648; G09G 3/3607; G09G 3/3413; G02F 2001/133302
See application file for complete search history.

(56) References Cited

U.S. PATENT DOCUMENTS

2010/0283801 A1* 11/2010 Wu ...................... G09G 3/2003
345/690
2011/0122176 A1* 5/2011 Numao ................ G09G 3/3607
345/690

(Continued)

FOREIGN PATENT DOCUMENTS

| CN | 104036748 A | 9/2004 |
| CN | 101226306 A | 7/2008 |

*Primary Examiner* — Abbas Abdulselam
(74) *Attorney, Agent, or Firm* — Andrew C. Cheng

(57) ABSTRACT

A field sequential color liquid crystal display (FSC-LCD) device and a color control method thereof are provided. The FSC-LCD device includes: a liquid crystal display panel which includes a color filter of first color sub-pixel and a color filter of second color sub-pixel, and a color field period thereof is sequentially divided into a first sub-color-field period and a second sub-color-field period; and a backlight module for providing a backlight source to the liquid crystal display panel and including a red backlight and a cyan backlight. The backlight module is for providing two color backlights respectively during a first backlighting period in the first sub-color-field period and a second backlighting period in the second sub-color-field period. The present FSC-LCD device has larger aperture ratio and higher transmittance, can achieve high color gamut display, and is easily to realize the narrow border design while reducing the amount of LED.

11 Claims, 2 Drawing Sheets

(51) Int. Cl.
*F21V 8/00* (2006.01)
*G02F 1/1335* (2006.01)
*G09G 3/20* (2006.01)
*G02F 1/1368* (2006.01)
*G02F 1/1333* (2006.01)

(52) U.S. Cl.
CPC .. *G02F 1/133514* (2013.01); *G02F 1/133528* (2013.01); *G02F 1/133621* (2013.01); *G09G 3/2003* (2013.01); *G09G 3/342* (2013.01); *G09G 3/36* (2013.01); *G09G 3/3607* (2013.01); *G09G 3/3648* (2013.01); *G02F 1/1368* (2013.01); *G02F 2001/133302* (2013.01); *G02F 2001/133622* (2013.01); *G09G 2300/0452* (2013.01)

(56) References Cited

U.S. PATENT DOCUMENTS

2012/0287168 A1* 11/2012 Botzas ................ G09G 3/3413
345/690
2014/0111561 A1* 4/2014 Iyama ................ G09G 3/3648
345/690

* cited by examiner

FIELD SEQUENTIAL COLOR LIQUID CRYSTAL DISPLAY DEVICE AND COLOR CONTROL METHOD THEREOF

TECHNICAL FIELD

The present invention relates to the field of liquid crystal display technology, and particularly to a field sequential color liquid crystal display device and a color control method thereof.

DESCRIPTION OF RELATED ART

With the development of electro-optical and semiconductor technologies, the development of flat panel display devices is promoted. In various types of flat panel display devices, the liquid crystal display device has becoming a mainstream of market owing to its superior characteristics of high space utilization efficiency, low power consumption, radiation free and low electromagnetic interference, and so on.

The liquid crystal display device generally includes a liquid crystal display panel and a backlight module. Since the non-self-emissive characteristic of the liquid crystal display panel, it is necessary to dispose the backlight module below the liquid crystal display panel to provide a surface light source for the liquid crystal display panel, and the liquid crystal display panel display an image on the assist of the surface light source provided by the backlight module.

With the development of liquid crystal display technology, high-resolution and high color gamut of liquid crystal display device will become the main development directions. The conventional high color gamut of liquid crystal display device mainly is achieved by the method of using a blue light emitting chip and red and green phosphors to constitute a light emitting diode together with increasing the thickness of color filter. However, in the light emitting diode constituted by the blue light emitting chip and the red and green phosphors, besides the red phosphor and the green phosphor absorb the blue light and then are excited to respectively emit red light and green light, a small amount of the red phosphor will absorb the green light and then is excited to emit red light, but the efficiency of generating the red light by the excitation of the green light is low, which also is an important reason of the brightness of the light emitting diode constituted by the blue light emitting chip and the red and green phosphors being low.

SUMMARY

In order to solve the problem in the prior art, an objective of the present invention is to provide a field sequential color liquid crystal display device. The field sequential color liquid crystal display device includes a liquid crystal display panel and a backlight module. The liquid crystal display panel includes a color filter of first color sub-pixel and a color filter of second sub-pixel. A color field period of the liquid crystal display panel sequentially is divided into a first sub-color-field period and a second sub-color-field period. The backlight module is configured (i.e., structured and arranged) for providing a backlight source to the liquid crystal display panel. The backlight source includes a red backlight and a cyan backlight. During a first backlighting period in the first sub-color-field period, the backlight module provides one of two color backlights. During a second backlighting period in the second sub-color-field period, the backlight module provides the other of the two color backlights.

In an exemplary embodiment, the backlight module includes: a light guide plate and multiple (i.e., more than one) light sources. The light guide plate is disposed below the liquid crystal display panel and has at least one light-incident side surface. The light sources are disposed in the vicinity of the light-incident side surface. The light sources provides the one of the two color backlights during the first backlighting period in the first sub-color-field period, and the light sources provides the other of the two color backlights during the second backlighting period in the second sub-color-field period.

In an exemplary embodiment, the light sources each are a light emitting diode. The light emitting diode includes a red light emitting chip, a blue light emitting chip and a green phosphor casing. The green phosphor encloses the red light emitting chip and the blue light emitting chip.

In an exemplary embodiment, the field sequential color liquid crystal display device further comprises a sequential color controller. In the first sub-color-field period, the sequential color controller is configured to supply color image data corresponding to the one of the two color backlights to the liquid crystal display panel; and in the second sub-color-field period, the sequential color controller is configured to supply color image data corresponding to the other of the two color backlights to the liquid crystal display panel.

In an exemplary embodiment, the sequential color controller further is configured to supply pulse width modulation (PWM) control signals to the backlight module to respectively control backlight enabling periods of the two color backlights provided by the backlight module. During the first backlighting period in the first sub-color-field period, the PWM control signal for controlling the one of the two color backlights is enabled, while the PWM control signal for controlling the other of the two color backlights is disabled. During the second backlighting period in the second sub-color-field period, the PWM control signal for controlling the one of the two color backlights is disabled, while the PWM control signal for controlling the other of the two color backlights is enabled.

In an exemplary embodiment, the color filter of first color sub-pixel is a color filter of magenta sub-pixel, and the color filter of second color sub-pixel is a color filter of yellow sub-pixel. During the first backlighting period in the first sub-color-field period, the backlight module provides the cyan backlight, and thereby the color filter of first color sub-pixel allows blue light component to pass therethrough, and the color filter of second color sub-pixel allows green light component to pass therethrough. During the second backlighting period in the second sub-color-field period, the backlight module provides the red backlight, and thereby the color filter of first color sub-pixel and the color filter of second color sub-pixel both allow red light component to pass therethrough.

In an exemplary embodiment, the color filter of first color sub-pixel is a color filter of magenta sub-pixel, and the color filter of second color sub-pixel is a color filter of yellow sub-pixel. During the first backlighting period in the first sub-color-field period, the backlight module provides the red backlight, and thereby the color filter of first color sub-pixel and the color filter of second color sub-pixel both allow red light component to pass therethrough. During the second backlighting period in the second sub-color-field period, the backlight module provides the cyan backlight, and thereby the color filter of first color sub-pixel allows blue light component to pass therethrough, and the color filter of second color sub-pixel allows green light component to pass therethrough.

Another objective of the present invention is to provide a color control method of a field sequential color liquid crystal display device. The field sequential color liquid crystal display device includes a liquid crystal display panel and a backlight module. The liquid crystal display panel includes a color filter of first color sub-pixel and a color filter of second color sub-pixel. The backlight module is configured for providing a backlight source to the liquid crystal display panel. The backlight source includes a red backlight and a cyan backlight. The color control method includes: sequentially dividing a color field period of the liquid crystal display panel into a first sub-color-field period and a second sub-color-field period; providing one of two color backlights during a first backlighting period in the first sub-color-field period; and providing the other of the two color backlights during a second backlighting period in the second sub-color-field period.

In an exemplary embodiment, before providing one of two color backlights during a first backlighting period in the first sub-color-field period, the color control method further includes supplying color image data corresponding to the one of the two color backlights to the liquid crystal display panel in the first sub-color-field period. Before providing the other of the two color backlights during a second backlighting period in the second sub-color-field period, the color control method further includes: providing color image data corresponding to the other of the two color backlights to the liquid crystal display panel in the second sub-color-field period.

In an exemplary embodiment, the step of providing one of two color backlights during a first backlighting period in the first sub-color-field period includes: during the first backlighting period in the first sub-color-field period, enabling a PWM control signal for controlling the one of the two color backlights, while disabling a PWM control signal for controlling the other of the two color backlights. The step of providing the other of the two color backlights during a second backlighting period in the second sub-color-field period includes: during the second backlighting period in the second sub-color-field period, disabling the PWM control signal for controlling the one of the two color backlights, while enabling the PWM control signal for controlling the other of the two color backlights.

Sum up, the field sequential color liquid crystal display device and the color control method thereof according to the present invention may only need two types of color sub-pixels to achieve the display, the production capacity of the liquid crystal display panel can be improved; and compared with the conventional liquid crystal display device with the same resolution, larger aperture ratio and higher transmittance can be achieved. In addition, since the backlight module only uses one type of LED formed by the red and blue chips and the green phosphor, the periodic switching of colors of backlight can be achieved by individually turning on the red and blue chips, and high color gamut of the liquid crystal display device can be achieved after adopting such LED. Compared with the conventional LED of RGB chips, the amount of LED is reduced and it is easily to realize the narrow border design.

BRIEF DESCRIPTION OF THE DRAWINGS

The above and other aspects, features and advantages of embodiments of the present invention will be more apparent from the following detailed description taken in conjunction with the accompanying drawings, in which.

DETAILED DESCRIPTION OF EMBODIMENTS

Figure 1:
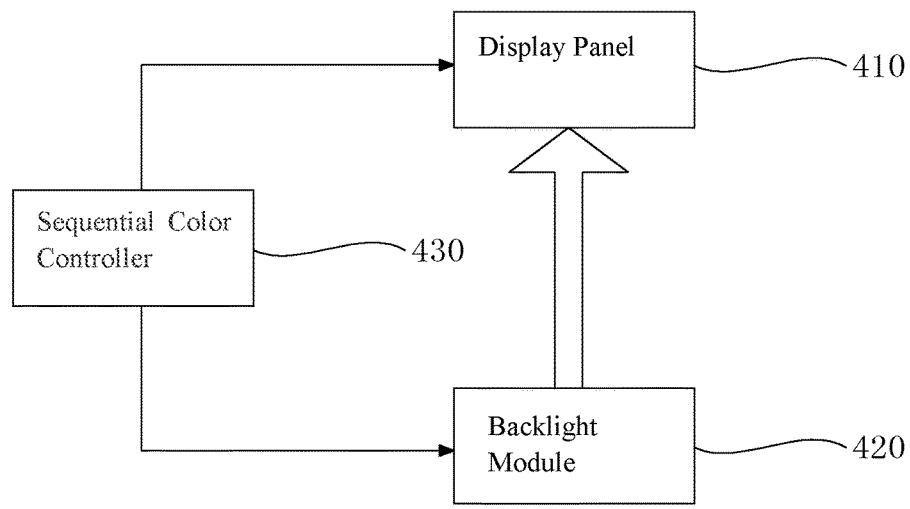
FIG. 1 is a schematic architecture diagram of a field sequential color liquid crystal display device according to an embodiment of the present invention.

In the following, various embodiments of the present invention will be described in detail with reference to accompanying drawings. The present invention may be embodied in many different forms and should not be construed as limiting to the embodiments set forth herein. Rather, these embodiments are provided to explain the principles of the present invention and its practical applications, so that other skilled in the art can understand various embodiments of the present invention and various modifications suitable for specific intended applications.

In the drawings, the same reference numerals will be used throughout the drawings to refer to the same or like components. It is understood that, although the terminologies such as "first", "second", "third", "fourth" can be used herein to describe various components, these components should not be limited by the terminologies. These terminologies are only used to distinguish one component from another component.

FIG. 1 is a schematic architecture diagram of a field sequential color liquid crystal display device according to an embodiment of the present invention.

Referring to FIG. 1, the field sequential color liquid crystal display device according to the embodiment of the present invention includes a liquid crystal display panel 410, a backlight module 420 and a sequential color controller 430.

Figure 2:
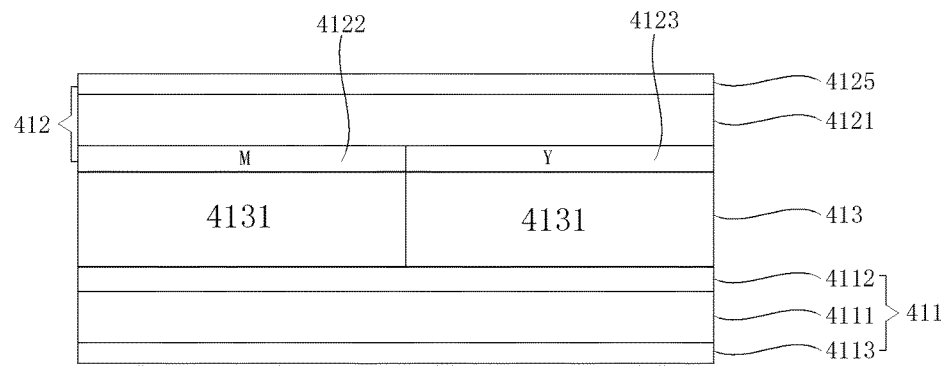
FIG. 2 is a schematic sectional view of a liquid crystal display panel according to an embodiment of the present invention.

In the following, the liquid crystal display pane 410 according to the embodiment of the present invention will be described in detail. FIG. 2 is a schematic sectional view of the liquid crystal display panel according to an embodiment of the present invention.

Referring to FIG. 2, the liquid crystal display panel 410 includes a thin film transistor (TFT) array substrate 411, a color filter substrate 412, and a liquid crystal layer 413 interposed between the thin film transistor array substrate 411 and the color filter substrate 412.

Concretely speaking, the thin film transistor array substrate 411 includes a glass substrate 4111, thin film transistors 4112 disposed on the glass substrate 4111 and arranged in an array, and a first polarizer 4113 disposed below the glass substrate 4111.

The color filter substrate 412 is disposed opposite to the thin film transistor array substrate 411 and includes a transparent substrate 4121, a color filter of first color sub-pixel 4122 and a color filter of second color sub-pixel 4123 disposed between the transparent substrate 4121 and the liquid crystal layer 413, and a second polarizer 4125 disposed on the transparent substrate 4121.

The color filter of first color sub-pixel 4122 and the color filter of second color sub-pixel 4123 constitute a display pixel. In this embodiment, the color filters may be filmy plastic plates or glass plates.

The liquid crystal layer 413 includes multiple (i.e., more than one) spacedly-disposed sub-pixel areas 4131. Each of the sub-pixel areas 4131 is filled with liquid crystal molecules. The color filter of first color sub-pixel 4122 and the color filter of second color sub-pixel 4123 each are corresponding to one sub-pixel area 4131.

Figure 3:
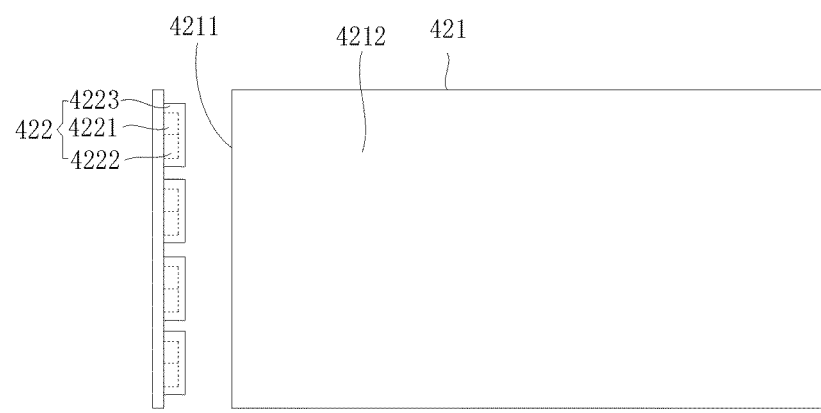
FIG. 3 is a schematic top view of a backlight module according to an embodiment of the present invention.

In the following, the backlight module 420 according to the embodiment of the present invention will be described in detail. FIG. 3 is a schematic top view of the backlight module according to an embodiment of the present invention.

Referring to FIG. 3, the backlight module 420 according to the embodiment of the present invention includes a light guide plate 421 and multiple light sources 422.

Concretely speaking, the light guide plate 421 includes a light-incident side surface 4211 and a light-exit top surface 4212. The light guide plate 421 uniformizes light incident therein and then outputs the light from the light-exit top surface 4212 to the liquid crystal display panel 410 as shown in FIG. 2, so that the liquid crystal display panel 410 can display an image on the assist of the light provided from the light-exit top surface 4212. The light sources 422 are arranged at equal intervals in the vicinity of the light-incident side surface 4211. Light emitted from the light sources 422 enters into the light guide plate 421 through the light-incident side surface 4211.

In this embodiment, the light sources 422 each are a light emitting diode (LED), but the present invention is not limited to this. The light emitting diode includes a red light emitting chip 4221, a blue light emitting chip 4222 and a green phosphor casing 4223. The green phosphor casing 4223 encloses the red light emitting chip 4221 and the blue light emitting chip 4222. The light sources 422 are subjected to the control of the sequential color controller 430 as shown in FIG. 1, so that different color light emitting chips are excited at different time periods, and will be described in detail as follows.

Figure 4:
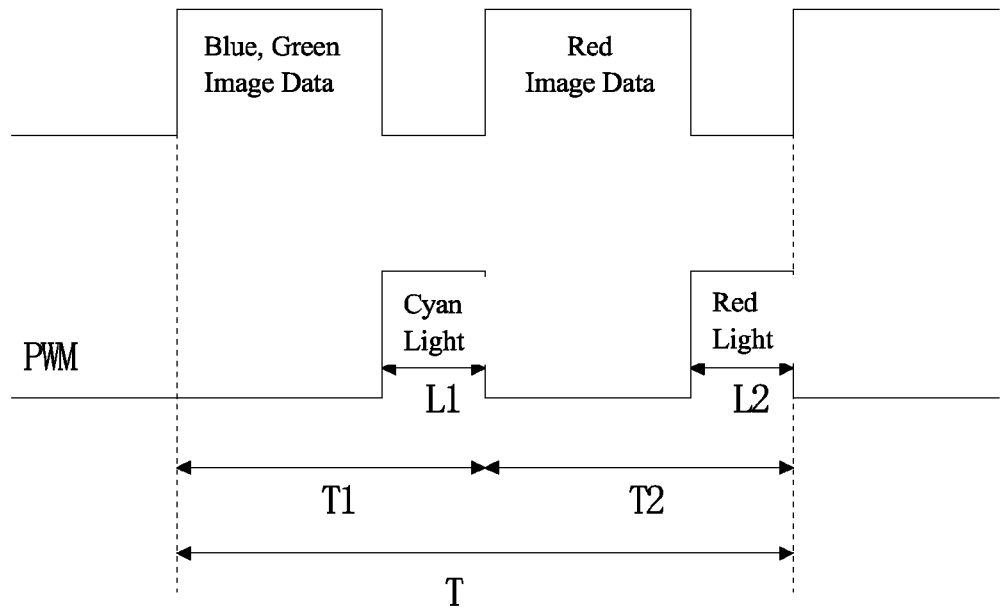
FIG. 4 is a schematic driving waveform diagram of a field sequential color liquid crystal display device according to an embodiment of the present invention.

In the following, a color control method (i.e., driving display method) of the field sequential color liquid crystal display device according to the embodiment of the present invention will be described in detail. FIG. 4 is a schematic driving waveform diagram of the field sequential color liquid crystal display device according to an embodiment of the present invention.

Referring to FIGS. 1 through 4, a frame period (also referred to as color field period) T of the liquid crystal display panel 410 sequentially is divided into a first sub-color-field period T1 and a second sub-color-field period T2. Since in the timeline, the original color field rate is 60 (Frame per second, fps), that is, the liquid crystal display panel 410 displays one complete colored image in every about 16.67 milliseconds (ms); accordingly, the field sequential color liquid crystal display device according to the embodiment of the present invention needs to increase the color field rate up to for example 120 fps, i.e., each sub-color-field is displayed in $\frac{1}{120}$ seconds (i.e., about 8.33 ms) and two sub-color-fields constitute one complete colored image.

In this embodiment, the backlight module 420 provides a backlight source to the liquid crystal display panel 410. The backlight source includes a red (R) backlight and a cyan (C) backlight. The backlight module 420 can generate the red backlight by the green phosphor excited by the red light emitting chip 4221, or generate the cyan backlight by the green phosphor excited by the blue light emitting chip 4222.

The sequential color controller 430 controls all light valves for controlling liquid crystal molecules in the sub-pixel areas respectively corresponding to the color filter 4122 of first color sub-pixel and the color filter 4123 of second color sub-pixel to be turned-on in the first sub-color-field period T1 and the second sub-color-field period T2, and sequentially writes various image data into the liquid crystal display panel 410 in the first sub-color-field period T1 and the second sub-color-field period T2. Meanwhile, the sequential color controller 120 controls the backlight module 420 to provide corresponding backlights to the liquid crystal display panel 410 in the first sub-color-field period T1 and the second sub-color-field period T2, so as to achieve the display of the liquid crystal display panel 410.

In this embodiment, the color filter of first color sub-pixel 4122 is a color filter of magenta (M) sub-pixel, and the color filter of second color sub-pixel 4123 is a color filter of yellow (Y) sub-pixel.

Accordingly, during a first backlighting period L1 in the first sub-color-field period T1, the backlight module 420 provides a cyan backlight, the color filter of first color sub-pixel 4122 ideally allows blue light component to pass therethrough, the color filter of second color sub-pixel 4123 ideally allows green light component to pass therethrough, and the liquid crystal display panel 410 displays color image data corresponding to the cyan backlight, i.e., blue image data and green image data. During a second backlighting period L2 in the second sub-color-field period T2, the backlight module 420 provides a red (R) backlight, the color filter of first color sub-pixel 4122 and the color filter of second color sub-pixel 4123 both ideally allow red light component to pass therethrough, and the liquid crystal display panel 410 displays color image data corresponding to the red backlight, i.e., red image data.

Backlight enabling periods of the red backlight and the cyan backlight provided by the backlight module 420 can be controlled by duty cycles of corresponding pulse width modulation (PWM) control signals provided by the sequential color controller 430. The cyan backlight can be generated by the green phosphor excited by the blue light emitting chip 4222, and therefore during the first backlighting period L1, the PWM control signal for controlling the red light emitting chip 4221 to work (i.e., for controlling the red backlight) is disabled, and the PWM control signal for controlling the blue light emitting chip 4222 to work (i.e., for controlling the cyan backlight) is enabled. The red backlight can be generated by the green phosphor excited by the red light emitting chip 4221, and therefore during the second backlighting period L2, the PWM control signal for controlling the blue light emitting chip 4222 to work (i.e., for controlling the cyan backlight) is disabled, and the PWM control signal for controlling the red light emitting chip 4221 to work (i.e., for controlling the red backlight) is enabled.

Figure 5:
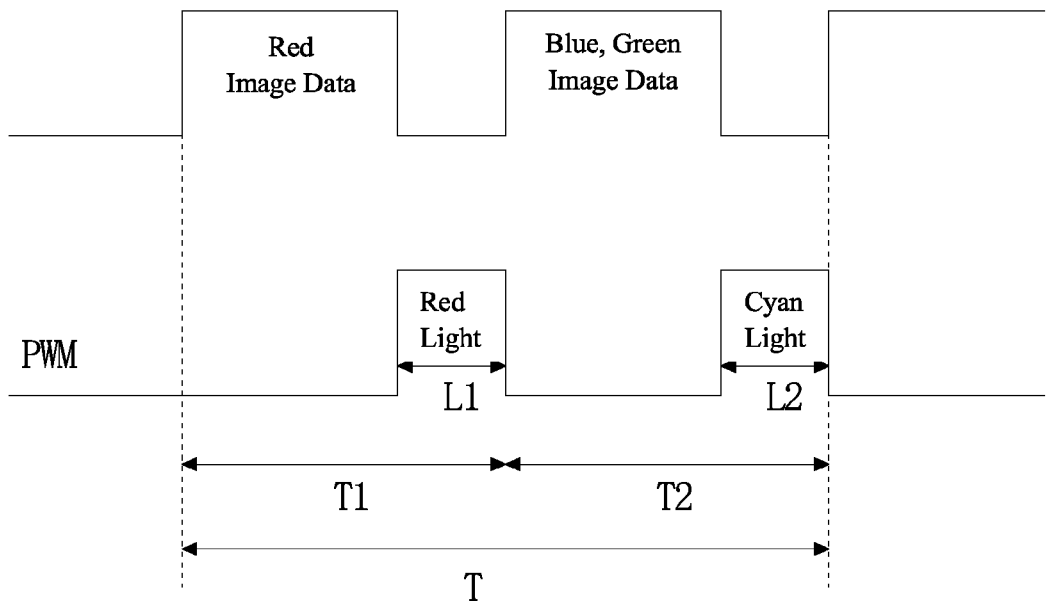
FIG. 5 is a schematic driving waveform diagram of a field sequential color liquid crystal display device according to another embodiment of the present invention.

As another embodiment of the present invention, referring to FIG. 5, during the first backlighting period L1 in the first sub color field period T1, the backlight module 420 provides the red backlight, the color filter of first color sub-pixel 4122 and the color filter of second color sub-pixel 4123 both ideally allow red light component to pass therethrough, and the liquid crystal display panel 410 displays color image data corresponding to the red backlight, i.e., red image data. During the second backlighting period L2 in the second sub color field period T2, the backlight module 420 provides the cyan backlight, the color filter of first color sub-pixel ideally allows blue light component to pass therethrough, the color filter of second color sub-pixel 4123 ideally allows green light component to pass therethrough, and the liquid crystal display panel 410 displays color image data corresponding to the cyan backlight, i.e., blue image data and green image data.

Backlight enabling periods of the red backlight and the cyan backlight provided by the backlight module 420 can be controlled by duty cycles of corresponding pulse width modulation (PWM) control signals provided by the sequential color controller 430. The red backlight can be generated by the green phosphor excited by the red light emitting chip 4221, and therefore during the first backlighting period L1, the PWM control signal for controlling the red light emitting chip 4221 to work (i.e., for controlling the red backlight) is enabled, and the PWM control signal for controlling the blue light emitting chip 4222 to work (i.e., for controlling the cyan backlight) is disabled. The cyan backlight can be generated by the green phosphor excited by the blue light emitting chip 4222, and therefore during the second backlighting period L2, the PWM control signal for controlling the red light emitting chip 4221 to work (i.e., for controlling the red backlight) is disabled, and the PWM control signal for controlling the blue light emitting chip 4222 to work (i.e., for controlling the cyan backlight) is enabled.

In summary, the field sequential color liquid crystal display device and the color control method thereof according to the present invention may only need two types of color sub-pixels to achieve the display, the production capacity of liquid crystal display panel can be improved; and compared with the conventional liquid crystal display device with the same resolution, larger aperture ratio and higher transmittance can be achieved. In addition, since the backlight module only use one type of LED formed by red and blue chips and green phosphor, the periodic switching of colors of backlight can be achieved by individually turning on the red and blue chips, and high color gamut display of the liquid crystal display device can be achieved after employing such LED. Compared with the conventional LED of RGB chips, the amount of LED chip is reduced and it is easily to realize the narrow border design.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A field sequential color liquid crystal display device comprising:
    a liquid crystal display panel, comprising a color filter of first color sub-pixel and a color filter of second color sub-pixel, wherein a color field period of the liquid crystal display panel is sequentially divided into a first sub-color-field period and a second sub-color-field period;
    a backlight module, configured for providing a backlight source for the liquid crystal display panel, wherein the backlight source comprises a red backlight and a cyan backlight;
    wherein the backlight module is to provide one of two color backlights during a first backlighting period in the first sub-color-field period, and is to provide the other of the two color backlights during a second backlighting period in the second sub-color-field period;
    wherein the backlight module comprises:
        a light guide plate, disposed below the liquid crystal display panel and having at least one light-incident side surface;
        a plurality of light sources, disposed in the vicinity of the light-incident side surface;
        wherein the plurality of light sources are configured to generate the one of the two color backlights during the first backlighting period in the first sub-color-field period, and to generate the other of the two color backlights during the second backlighting period in the second sub-color-field period.

2. The field sequential color liquid crystal display device according to claim 1, wherein the plurality of light sources each are a light emitting diode, and the light emitting diode comprises a red light emitting chip, a blue light emitting chip and a green phosphor casing, the green phosphor casing encloses the red light emitting chip and the blue light emitting chip.

3. The field sequential color liquid crystal display device according to claim 2, wherein the field sequential color liquid crystal display device further comprises:
    a sequential color controller, configured for supplying color image data corresponding to the one of the two color backlights to the liquid crystal display panel during the first sub-color-field period and supplying color image data corresponding to the other of the two color backlights to the liquid crystal display panel during the second sub-color-field period.

4. The field sequential color liquid crystal display device according to claim 3, wherein the sequential color controller further is configured for supplying pulse width modulation control signals to the backlight module to thereby respectively control backlight enabling periods of the two color backlights provided by the backlight module;
    during the first backlighting period in the first sub-color-field, the pulse width modulation control signal for controlling the one of the two color backlights is enabled, while the pulse width modulation control signal for controlling the other of the two color backlights is disabled;
    during the second backlighting period in the second sub-color-field period, the pulse width modulation control signal for controlling the one of the two color backlights is disabled, while the pulse width modulation control signal for controlling the other of the two color backlights is enabled.

5. The field sequential color liquid crystal display device according to claim 1, wherein the field sequential color liquid crystal display device further comprises:
    a sequential color controller, configured for supplying color image data corresponding to the one of the two color backlights to the liquid crystal display panel during the first sub-color-field period and supplying color image data corresponding to the other of the two color backlights to the liquid crystal display panel during the second sub-color-field period.

6. The field sequential color liquid crystal display device according to claim 5, wherein the sequential color controller further is configured for supplying pulse width modulation control signals to the backlight module to thereby respectively control backlight enabling periods of the two color backlights provided by the backlight module;
    during the first backlighting period in the first sub-color-field, the pulse width modulation control signal for controlling the one of the two color backlights is enabled, while the pulse width modulation control signal for controlling the other of the two color backlights is disabled;

during the second backlighting period in the second sub-color-field period, the pulse width modulation control signal for controlling the one of the two color backlights is disabled, while the pulse width modulation control signal for controlling the other of the two color backlights is enabled.

7. The field sequential color liquid crystal display device according to claim 1, wherein the color filter of first color sub-pixel is a color filter of magenta sub-pixel, and the color filter of second color sub-pixel is a color filter of yellow sub-pixel;

during the first backlighting period in the first sub-color-field period, the backlight module is to provide the cyan backlight, and thereby the color filter of first color sub-pixel allows blue light component to pass therethrough and the color filter of second color sub-pixel allows green light component to pass therethrough;

during the second backlighting period in the second sub-color-field period, the backlight module is to provide the red backlight, and thereby the color filter of first color sub-pixel and the color filter of second color sub-pixel both allow red light component to pass therethrough.

8. The field sequential color liquid crystal display device according to claim 1, wherein the color filter of first color sub-pixel is a color filter of magenta sub-pixel, and the color filter of second color sub-pixel is a color filter of yellow sub-pixel;

during the first backlighting period in the first sub-color-field period, the backlight module is to provide the red backlight, and thereby the color filter of first color sub-pixel and the color filter of second color sub-pixel both allow red light component to pass therethrough;

during the second backlighting period in the second sub-color-field period, the backlight module is to provide the cyan backlight, and thereby the color filter of first color sub-pixel allows blue light component to pass therethrough and the color filter of second color sub-pixel allows green light component to pass therethrough.

9. A color control method of a field sequential color liquid crystal display device, the field sequential color liquid crystal display device comprising a liquid crystal display panel and a backlight module, the liquid crystal display panel comprising a color filter of first color sub-pixel and a color filter of second color sub-pixel, the backlight module being configured for providing a backlight source to the liquid crystal display panel, the backlight source comprising a red backlight and a cyan backlight; the color control method comprising:

sequentially dividing a frame period of the liquid crystal display panel into a first sub-color-field period and a second sub-color-field period;

providing one of two color backlights during a first backlighting period in the first sub-color-field period;

providing the other of the two color backlights during a second backlighting period in the second sub-color-field period;

wherein the step of providing one of two color backlights during a first backlighting period in the first sub-color-field period comprises: during the first backlighting period in the first sub-color-field period, enabling a pulse width modulation control signal for controlling the one of the two color backlights while disabling a pulse width modulation control signal for controlling the other of the two color backlights;

wherein the step of providing the other one of the two color backlights during a second backlighting period in the second sub-color-field period comprises: during the second backlighting period in the second sub-color-field period, disabling the pulse width modulation control signal for controlling the one of the two color backlights while enabling the pulse width modulation control signal for controlling the other of the two color backlights.

10. The color control method according to claim 9, wherein before providing one of two color backlights during a first backlighting period in the first sub-color-field period, the color control method further comprises:

providing color image data corresponding to the one of the two color backlights to the liquid crystal display panel during the first sub-color-field period;

before providing the other of the two color backlights during the second backlighting period in the second sub-color-field period, the color control method further comprises:

providing color image data corresponding to the other of the two color backlights to the liquid crystal display panel during the second sub-color-field period.

11. A field sequential color liquid crystal display device comprising:

a liquid crystal display panel, comprising a color filter of first color sub-pixel and a color filter of second color sub-pixel, wherein a color field period of the liquid crystal display panel is divided into a first sub-color-field period and a second sub-color-field period;

a backlight module, configured for providing a backlight source for the liquid crystal display panel, wherein the backlight source comprises a red backlight and a cyan backlight;

wherein the backlight module is to provide one of two color backlights during a first backlighting period in the first sub-color-field period, and is to provide the other of the two color backlights during a second backlighting period in the second sub-color-field period;

wherein the color filter of first color sub-pixel is a color filter of magenta sub-pixel, and the color filter of second color sub-pixel is a color filter of yellow sub-pixel;

during the first backlighting period in the first sub-color-field period, the backlight module is to provide the cyan backlight, and thereby the color filter of first color sub-pixel allows blue light component to pass therethrough and the color filter of second color sub-pixel allows green light component to pass therethrough;

during the second backlighting period in the second sub-color-field period, the backlight module is to provide the red backlight, and thereby the color filter of first color sub-pixel and the color filter of second color sub-pixel both allow red light component to pass therethrough.

* * * * *